US011256677B2

(12) United States Patent
Gong et al.

(10) Patent No.: US 11,256,677 B2
(45) Date of Patent: Feb. 22, 2022

(54) METHOD, DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Yunhai Gong, Shanghai (CN); Ao Sun, Shanghai (CN); You Chen, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 296 days.

(21) Appl. No.: 16/512,111

(22) Filed: Jul. 15, 2019

(65) Prior Publication Data

US 2020/0341961 A1 Oct. 29, 2020

(30) Foreign Application Priority Data

Apr. 25, 2019 (CN) .......................... 201910338507.0

(51) Int. Cl.
*G06F 16/22* (2019.01)
*G06F 16/23* (2019.01)

(52) U.S. Cl.
CPC ...... *G06F 16/2272* (2019.01); *G06F 16/2246* (2019.01); *G06F 16/2365* (2019.01); *G06F 16/2379* (2019.01)

(58) Field of Classification Search
None
See application file for complete search history.

(56) References Cited

U.S. PATENT DOCUMENTS

| 7,401,064 | B1* | 7/2008 | Arone | G06F 16/25 |
| 9,779,015 | B1* | 10/2017 | Oikarinen | G06F 16/10 |
| 2011/0264880 | A1* | 10/2011 | Ylonen | G06F 12/0261 |
| | | | | 711/162 |
| 2020/0125941 | A1* | 4/2020 | Gold | G06F 9/5027 |
| 2020/0201822 | A1* | 6/2020 | Wang | G06F 16/1873 |
| 2020/0333970 | A1* | 10/2020 | Mukku | G06F 3/0641 |

* cited by examiner

*Primary Examiner* — Richard L Bowen
(74) *Attorney, Agent, or Firm* — Amin, Turocy & Watson, LLP

(57) ABSTRACT

Management of a storage system is enabled. In an example, a partition index associated with the partition is obtained, the partition index comprising a group of nodes, a node in the group of nodes indicating metadata of an object in the group of objects. A valid node in the partition index is identified, the valid node indicating valid metadata of an object associated with the valid node in the storage system. A local index for the partition index is generated based on the valid node. In response to receiving an access request for a target object in the group of objects, the target object in the storage system is accessed based on the local index. With the foregoing example implementations, metadata in the storage system may be accessed more efficiently, and the overall response speed of the storage system may be increased.

20 Claims, 9 Drawing Sheets

METHOD, DEVICE, AND COMPUTER PROGRAM PRODUCT FOR MANAGING STORAGE SYSTEM

RELATED APPLICATION

The present application claims the benefit of priority to Chinese Patent Application No. 201910338507.0, filed on Apr. 25, 2019, which application is hereby incorporated into the present application by reference herein in its entirety.

FIELD

Various implementations of the present disclosure relate to storage management, and more specifically, to a method, device and computer program product for managing an index in a storage system.

BACKGROUND

With the development of data storage technology, various data storage devices now can provide increasingly high data storage capacity to users. There has been proposed the concept of distributed storage system, and user data may be distributed over various nodes included in the distributed storage system. Further, as data storage capacity increases, users also make higher demands on the response time of storage systems. So far there has been developed a technical solution for building an index for data stored in a storage system so as to accelerate data access speed.

Since there may exist a great number of user data in a distributed system and an index of user data may take up a large storage space, the index is usually stored in a distributed manner on multiple nodes in the distributed storage system. During operation of the distributed storage system, it is usually necessary to traverse the index to find desired data. This will produce huge time overhead and further reduce the response speed of the storage system. At this point, how to increase the response speed of the storage system becomes a hot research topic.

SUMMARY

Therefore, it is desirable to develop and implement a technical solution for managing a storage system more effectively. It is desired that the technical solution can be compatible with an existing storage system and manage the storage system more effectively by reconstructing various configurations of the existing storage system.

According to a first aspect of the present disclosure, there is provided a method for managing a storage system. The storage system comprises at least one partition, and a partition of the at least one partition comprises a group of objects. In the method, a partition index associated with the partition is obtained, the partition index here comprises a group of nodes, and a node in the group of nodes indicates metadata of an object in the group of objects. A valid node in the partition index is identified, and the valid node indicates valid metadata of an object associated with the valid node in the storage system. A local index for the partition index is generated based on the valid node. In response to receiving an access request for a target object in the group of objects, the target object in the storage system is accessed based on the local index.

According to a second aspect of the present disclosure, there is provided a device for managing a storage system, the storage system comprises at least one partition, and a partition of the at least one partition comprising a group of objects. The device comprises: at least one processor; a volatile memory; and a memory coupled to the at least one processor, the memory having instructions stored thereon, the instructions, when executed by the at least one processor, causing the apparatus to perform acts. The acts include: obtaining a partition index associated with the partition, the partition index comprising a group of nodes, a node in the group of nodes indicating metadata of an object in the group of objects; identifying a valid node in the partition index, the valid node indicating valid metadata of an object associated with the valid node in the storage system; generating a local index for the partition index based on the valid node; and in response to receiving an access request for a target object in the group of objects, accessing the target object in the storage system based on the local index.

According to a third aspect of the present disclosure, there is provided a computer program product. The computer program product is tangibly stored on a non-transient computer readable medium and comprises machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION OF IMPLEMENTATIONS

Example implementations of the present disclosure will be described in more details with reference to the drawings. Although the drawings illustrate the example implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first," "second" and so on can refer to same or different objects. The following text also can comprise other explicit and implicit definitions.

Figure 1:
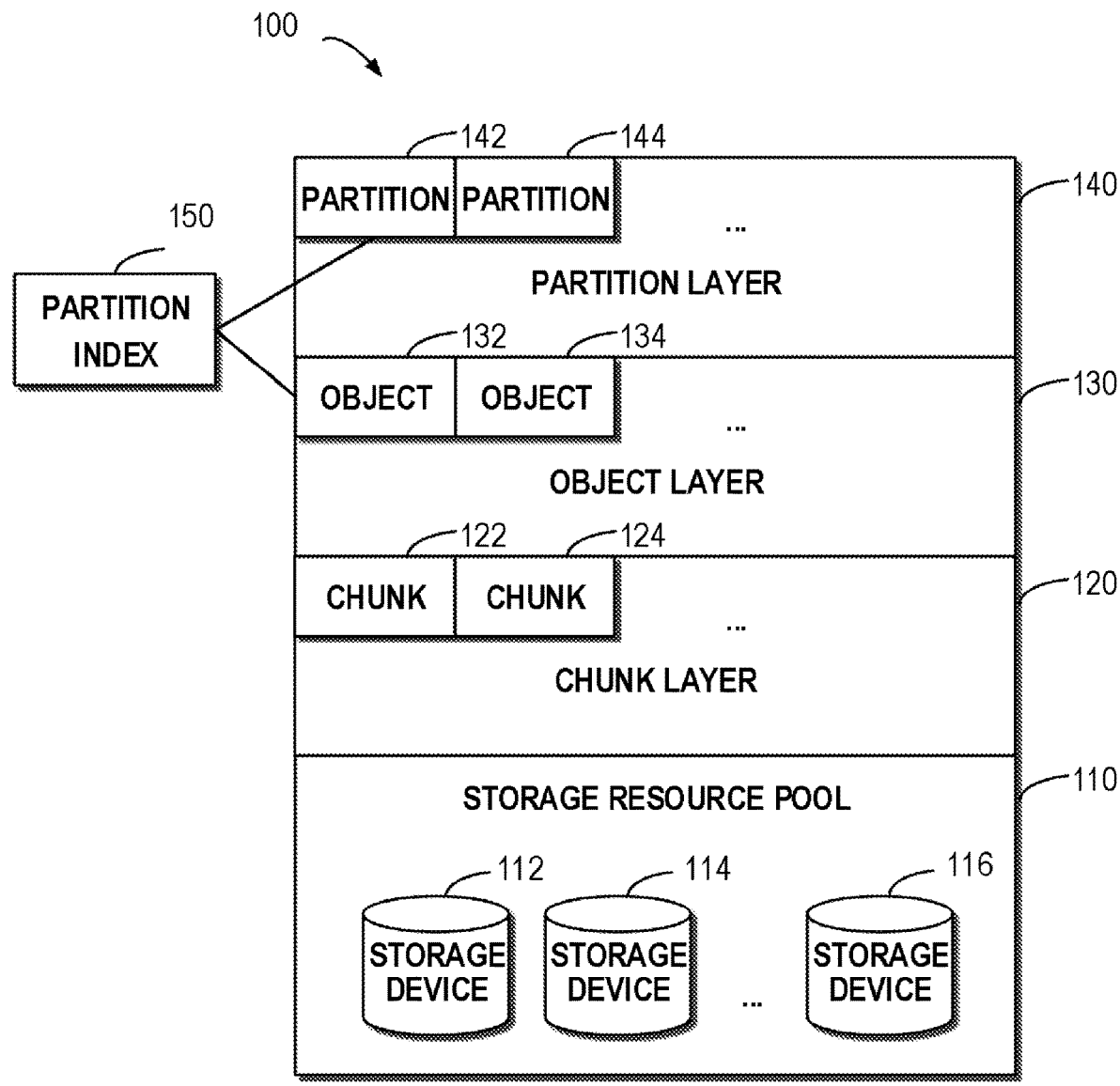
FIG. 1 illustrates a schematic view of a storage system in which a method of the present invention may be implemented.

Varieties of storage systems have been developed, for example, an object-oriented storage system may store user data by the unit of objects. The object here may be an image, video, audio, or data in other format. The object may be divided into one or more chunks and stored based on chunks. Specifically, FIG. 1 shows a schematic view of a storage system 100 in which a method of the present disclosure may be implemented. As depicted, a storage resource pool 110 may be provided, and the storage resource pool 110 may comprise multiple storage devices 112, 114, . . . , 116. Though the multiple independent physical storage devices 112, 114, . . . , 116 are shown here, the storage devices may further be virtual storage devices according to example implementations of the present disclosure.

A chunk layer 120 may be built over the storage resource pool 110. The chunk layer 120 may comprise multiple chunks 122, 124, etc. For different storage systems, chunks may be set as different sizes. An object layer 130 may be built over the chunk layer 120, and the object layer 130 is visible to users of the storage system 100. Here, an object may comprise one or more chunks depending on content stored in the object. For example, an object 132 may comprise two chunks (e.g., the chunks 122 and 124). For another example, an object 134 may comprise only one chunk.

As the storage system 100 runs, the storage system 100 may comprise numbers of objects. In order to facilitate management of various objects in the storage system 100, multiple objects in the object layer 130 may be divided into corresponding partitions based on a distributed hash table (DHT). For example, a partition layer 140 may comprise partitions 142, 144, etc. The number of partitions may be set based on the configuration of the storage system 100. For example, the number of partitions may be set as 128 or other value. At this point, one partition may comprise one or more objects.

In order to facilitate management of various objects in a partition, a partition index 150 may be built to store metadata associated with objects for the purpose of quickly and effectively accessing objects in the storage system. It will be understood FIG. 1 merely shows the partition index 150 for the partition 142 in a schematic manner. A corresponding index may be built for each partition in the partition layer 140. Further, tasks for managing objects in various partitions may be implemented by one or more node devices. It will be understood the node devices here may be, for example, the storage devices 112, 114, . . . , 116 or other devices with processing capabilities in the storage system 100.

Figure 2:
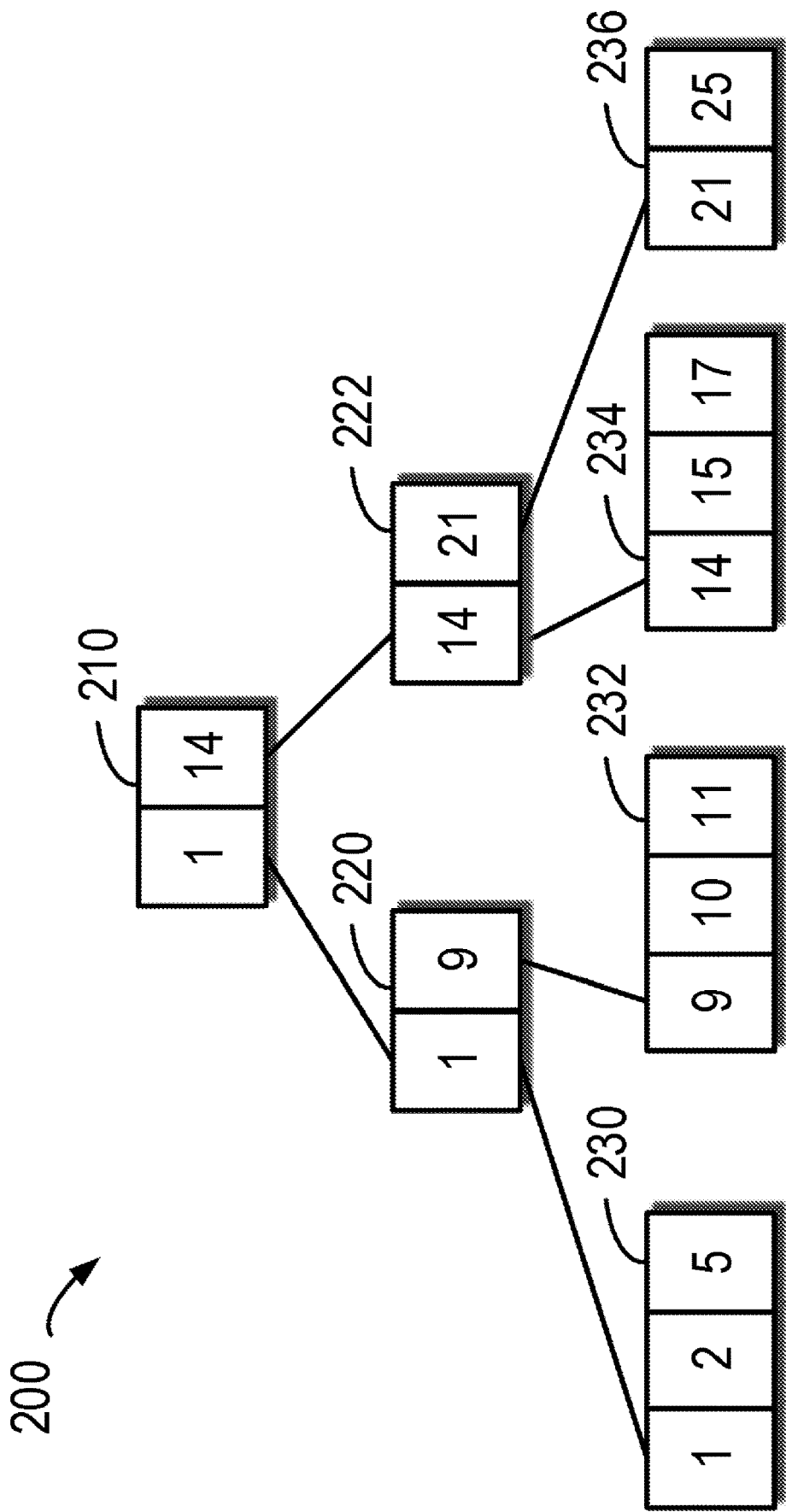
FIG. 2 schematically illustrates a block diagram of a partition index of a storage system according to implementations of the present disclosure.

FIG. 2 schematically shows a block diagram of a tree index 200 of the partition index 150 of a storage system according to implementations of the present disclosure. As depicted, the tree index 200 of the partition index 150 may comprise multiple layers. For example, the partition index 150 may be provided in the form of a binary tree, and each non-leaf node of the binary tree here may comprise two keywords. For example, a root node 210 may comprise keywords 1 and 14. According to a rule, objects with keywords falling within a range [1, 14) will be stored in a left sub-tree of the root node 210, and objects with keywords being greater than or equal to 14 will be stored in a right sub-tree of the root node 210.

At a root node 220 in the left sub-tree, further comprised are keywords 1 and 9, at which point according to the rule of the binary tree, objects with keywords falling within a range [1, 9) will be stored on the left of the node 220, and objects with keywords being greater than or equal to 9 and less than 14 will be stored on the right of the node 220. As shown in FIG. 2, relevant metadata of objects with keywords 1, 2 and 5 are stored in a leaf node 230 on the left, and relevant metadata of objects with keywords 9, 10 and 11 are stored in a leaf node 232 on the right.

For the right sub-tree of the root node 210, a root node 222 of the right sub-tree comprises keywords 14 and 21. At this point, according to the rule of the binary tree, objects with keywords falling within a range [14, 21) will be stored on the left of the node 222, and objects with keywords being greater than or equal to 21 will be stored on the right of the node 222. Relevant metadata of objects with keywords 14, 15 and 17 are stored in a leaf node 234 on the left, and relevant metadata of objects with keywords 21 and 25 are stored in a leaf node 236 on the right.

It will be understood in the partition index 150, a leaf node is used to store metadata of an object. For example, the leaf node may store metadata of an object in the key-value form, where a key represents an identifier of the object, and a value represents metadata of the object. The metadata here may comprise, for example, addresses of respective chunks included in the object, the type of the object, and update time of the object, etc.

It will be understood although FIG. 2 schematically shows the partition index 150 in the binary tree form, the partition index 150 may further be provided in other form according to example implementations of the present disclosure. For example, the partition index 150 may be stored using a multi-way tree, a B+ tree, and so on. It will be understood although as shown in FIG. 2 the partition index 150 comprises two layers of non-leaf nodes, the partition index 150 may further comprise more or less layers according to example implementations of the present disclosure.

During operations of the storage system 100, metadata of an object might be modified, at which point the partition index 150 needs to be updated. In the context of the present disclosure, the partition index 150 may be an index that may be appended. When data of a certain object are modified, a leaf node associated with the object is not modified but deleted directly, and a new leaf node is inserted to the partition index 150 to indicate current metadata of the object. Therefore, at this point the partition index 150 will comprise two types of leaf nodes: valid nodes, representing current metadata of objects included in the partition; invalid nodes, representing metadata of objects that used to be included in the partition but have been modified or deleted. As the storage system 100 runs, the partition index 150 might comprise many invalid nodes.

According to the partition index 150 as shown in FIG. 2, if there is a need to access a certain object in the storage system 100, then the partition index 150 needs to be searched using an identifier of the object. In order to increase access efficiency, the partition index 150 may be loaded to a cache. However, as the capacity of the cache is limited and many invalid nodes in the partition index 150 will reduce the query hit rate. If a cache miss occurs, metadata of the object to be accessed should be retrieved from an underlying device. Therefore, it is a burning problem regarding how to increase the hit rate of the partition index 150 and further improve the overall performance of the storage system 100.

Figure 3:
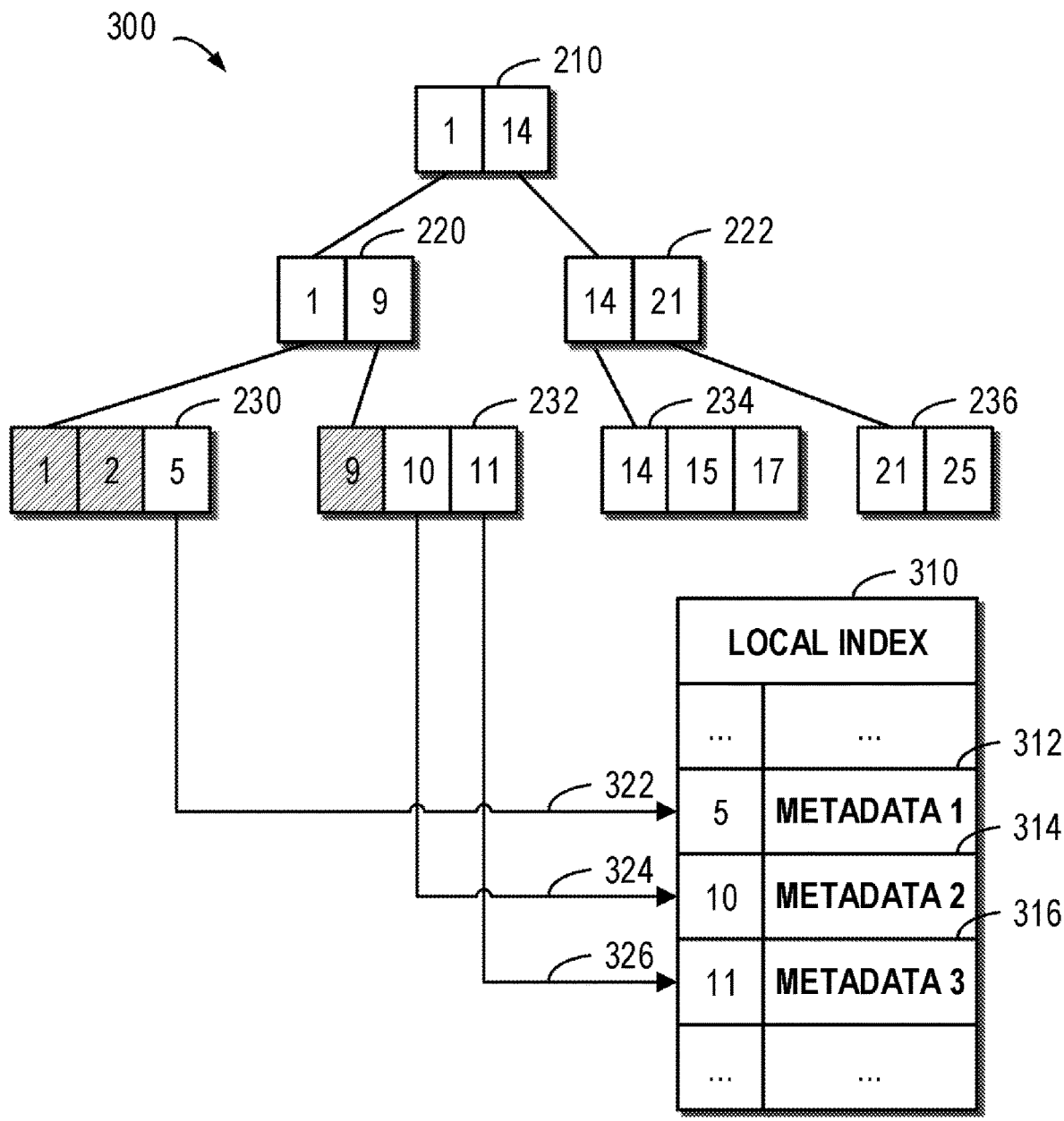
FIG. 3 schematically illustrates a block diagram for managing a partition index in a storage system according to implementations of the present disclosure.

To solve the foregoing drawbacks, implementations of the present disclosure provide a method, device and computer program product for managing the storage system 100. According to example implementations of the present disclosure, there is proposed a technical solution for building a local index based on valid nodes in the partition index 150 so as to improve the performance of the storage system 100. With reference to FIG. 3, a general description is presented below to implementations of the present disclosure. FIG. 3 schematically shows a block diagram 300 for managing a partition index 150 of the storage system 100 according to implementations of the present disclosure.

FIG. 3 shows the processing performed to a partition index 150 for one partition. For the sake of description, invalid nodes (e.g., leaf nodes with keywords of 1, 2 and 9) in the partition index 150 are shown with shaded legends, and valid nodes (e.g., leaf nodes with keywords of 5, 10, 11, 14, 15, 17, 21 and 25) in the partition index 150 are shown with blank legends. According to example implementations of the present disclosure, the partition index 150 associated with a partition may be obtained first. The partition index 150 here comprises a group of nodes, and a node in the group of nodes indicate metadata of an object in a group of objects. A valid node may be identified based on a mark in the partition index 150, the valid node here indicates valid metadata of an object associated with the valid node in the storage system 100. Specifically, the valid nodes may comprise leaf nodes with keywords of 5, 10, 11, 14, 15, 17, 21 and 25.

As shown in FIG. 3, a local index 310 for the partition index 150 may be generated based on the valid node. Specifically, the local index 310 may comprise entries associated with various valid nodes, for example, entries 312, 314 and 316 may correspond to valid nodes with keywords of 5, 10 and 11 respectively. At this point, if an access request for a target object in the group of objects is received, then the target object may be accessed in the storage system 100 based on the local index 310. For example, when an access request for an object with the keyword of 5 is received, retrieval may be directly performed in the local index 310 so as to find the entry 312. It will be understood as the local index 310 comprises data associated with all valid nodes, metadata of the object to be accessed may be directly found in the local index 310. In other words, the hit rate is as high as 100%. In this way, the efficiency of retrieving metadata may be increased significantly, and further the overall performance of the storage system 100 may be improved.

It will be understood FIG. 3 merely schematically shows one of feasible data structures of the local index 310, and those skilled in the art may store the local index 310 in other format. For example, the local index 310 may be stored using a table, an array, a linked list, a tree or other format, so long as the data structure can store keys-values associated with valid nodes in the partition index 150.

Figure 4:
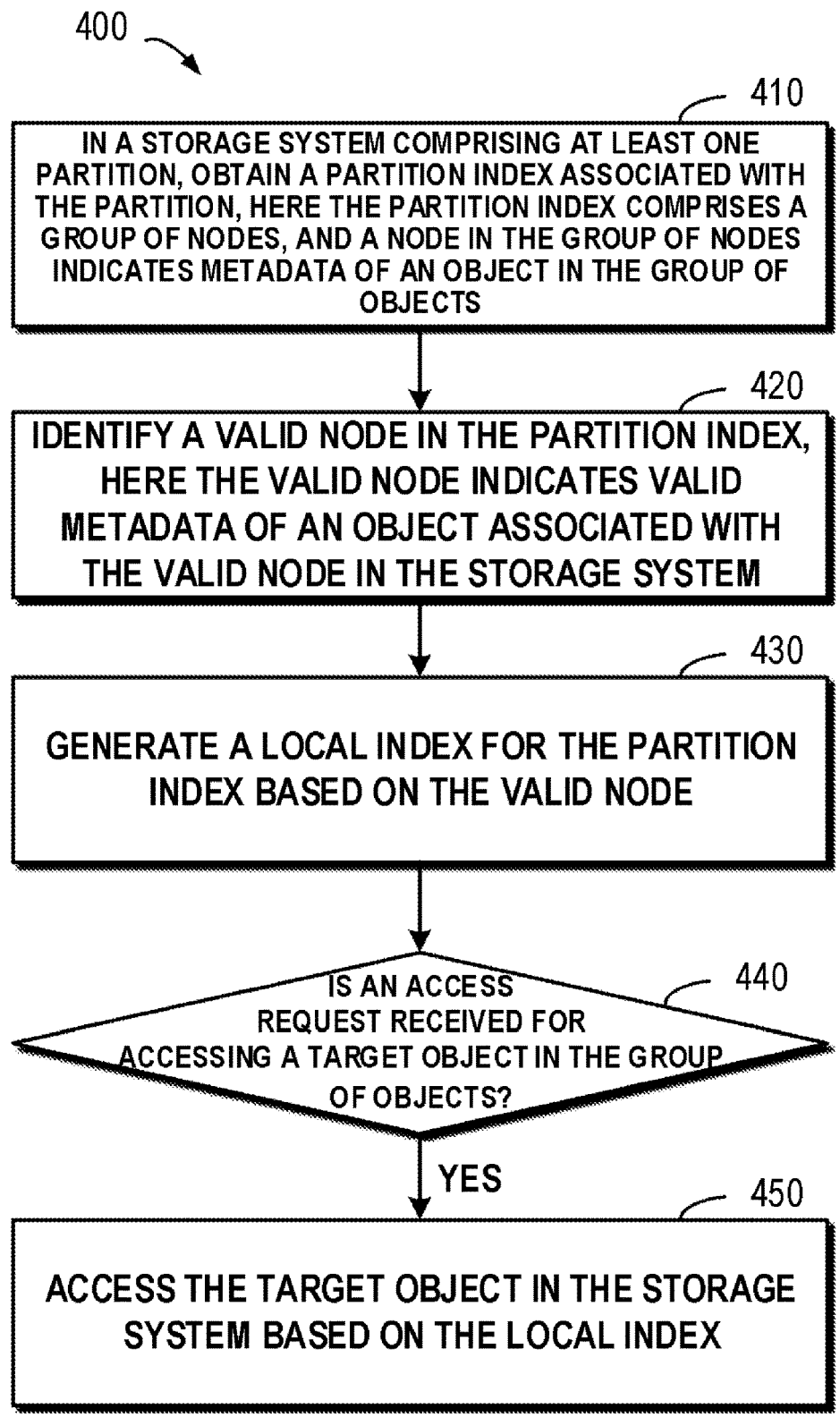
FIG. 4 schematically illustrates a flowchart of a method for managing a partition index in a storage system according to implementations of the present disclosure.

With reference to FIG. 4, a detailed description is presented below to more details about implementations of the present disclosure. FIG. 4 schematically shows a flowchart of a method 400 for managing a partition index 150 in a storage system 100 according to implementations of the present disclosure. At block 410, the partition index 150 associated with a partition is obtained. It will be understood the method 400 here merely describes operations performed to the partition index 150 for one partition in the storage system 100. The method 400 may further be applied to one or more other partitions in the storage system 100.

It will be understood the method 400 may replace the traditional method that stores the partition index 150 by a cache. At this point, in order to obtain the partition index 150, the partition index 150 may be read from a chunk in the storage system 100. Alternatively and/or in addition to, the method 400 may serve the storage system 100 jointly with the traditional method that stores the partition index 150 by a cache. At this point, first it may be checked whether the partition index 150 exists in the cache. If the partition index 150 exists in the cache (i.e., a hit), then the partition index 150 may be directly read from the cache. If the partition index 150 does not exist in the cache (i.e., a miss), then the partition index 150 may be read from a chunk in the storage system 100.

It will be understood the operation shown at block 410 may be treated as a pre-processing operation. For example, the method 400 may be performed when a certain node device is specified to manage a specific partition. In this way, a local index 310 of the partition index 150 may be generated in advance, so as to increase the efficiency of accessing objects included in the partition.

At block 420, a valid node in the partition index 150 may be identified, the valid node here indicates valid metadata of an object associated with the valid node in the storage system. In the context of the present disclosure, the partition index 150 may be an append-type tree index 200 as shown in FIG. 2. At this point, nodes in the tree index 200 can only be modified in an appended way. In other words, only new nodes can be inserted to the tree index 200, whereas existing nodes cannot be deleted from the tree index 200. The partition index 150 may comprise two types of nodes: leaf nodes and non-leaf nodes. Here, leaf nodes store metadata of objects and may comprise valid nodes and invalid nodes; non-leaf nodes stores data for the index so as to support more effective access to leaf nodes.

According to example implementations of the present disclosure, a "validity" mark may be set for a leaf node to indicate whether the leaf node is a valid node or not. During the running of the storage system 100, if an object is deleted, at this point a leaf node corresponding to the deleted object in the partition index 150 may be directly marked as "invalid." If an object is updated, then a leaf node corresponding to the updated object in the partition index 150 may be marked as "invalid," and a new valid node corresponding to the updated object may be inserted to the partition index 150.

It will be understood with the running of the storage system 100, for a specific object in the storage system 100, there may exist one valid node and might exist one or more invalid nodes in the partition index 150. At this point, since metadata in an invalid node are outdated and cannot reflect current state of a current object, the invalid node may be ignored while the local index 310 is generated.

Still with reference to FIG. 4, at block 430 the local index 310 for the partition index 150 may be generated based on the valid node. At this point, the local index 310 may be generated based on the valid node identified at block 420. Specifically, an object entry in the local index 310 may be generated based on a key and a value in the valid node. Here the key indicates an identifier of the object, and the value indicates metadata of the object. Returning to FIG. 3, as shown by an arrow 322, an object entry 312 in the local index 310 may be generated based on a leaf node with a keyword of 5. At this point, a key in the object entry 312 may be generated based on the keyword "5" (i.e., identifier of the object), and metadata 1 in the object entry 312 may be generated using metadata in the leaf node. Similarly, as shown by arrows 324 and 326, object entries 314 and 316 in the local index 310 may be generated based on leaf nodes with keywords of 10 and 11 respectively.

According to example implementations of the present disclosure, in order to increase the retrieval efficiency for the local index 310, an index entry in the local index 310 may further be generated based on at least one non-leaf node. At this point, the index entry may store index information in a non-leaf node in the partition index 150. Therefore, the object to be accessed may be found quickly based on the index entry in the local index 310.

Figure 5:
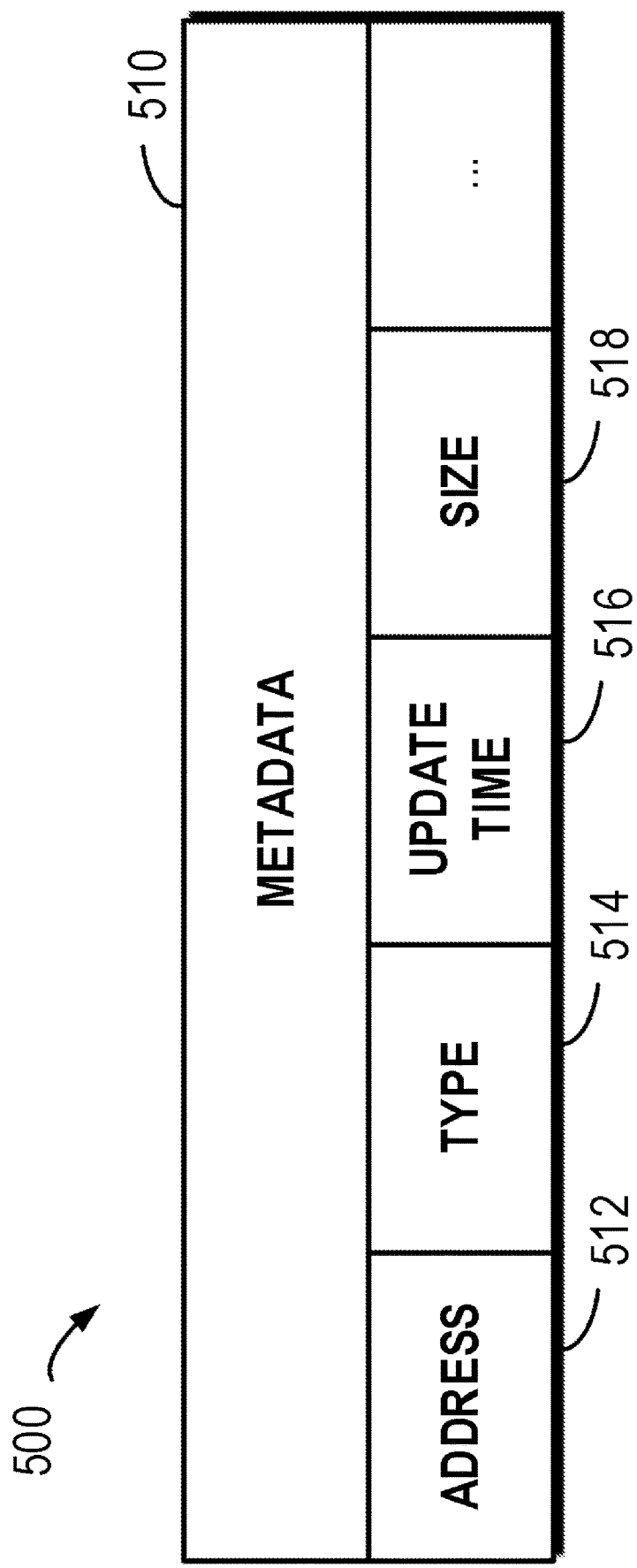
FIG. 5 schematically illustrates a block diagram of metadata according to implementations of the present disclosure.

According to example implementations of the present disclosure, the metadata of the object comprise an address of at least one chunk of the object. According to example implementations of the present disclosure, the metadata may further comprise any other information related to the object. FIG. 5 schematically shows a block diagram of a data structure 500 of metadata according to implementations of the present disclosure. As depicted, metadata 510 may comprise multiple fields: an address field 512, type 514 of the metadata, time 516 when the object is updated, size 518 of the object, etc. Here the address 512 may represent address(es) of one or more chunks included in the object. The type 514 may represent the type of the object, for example, the type may comprise image, audio, video, etc. The update time 516 may represent the time when the object is updated finally. The size 518 may represent the size of a storage space which the object occupies.

At block 440, it may be judged whether an access request for a target object in the group of objects is received or not. If a request is received, then the method 400 proceeds to block 450; otherwise, the method 400 ends. At block 450, the target object is accessed in the storage system 100 based on the local index 310. First an identifier of the target object may be determined from the access request, and then the local index 310 is searched using the determined identifier for finding metadata corresponding to the identifier.

A next operation may be determined based on the operation type specified in the access request. Suppose the access request wants to read data of various chunks in the object, then corresponding data may be accessed based on an address of one or more chunks as indicated in the address 512 in the metadata 510. Suppose the access request wants to query the type of the object, then the type indicated in the type 514 may be returned. It will be understood in the context of the present disclosure, the user does not need to know a physical storage address of the target object to be accessed, and the address 512 in the metadata is transparent to the user.

According to example implementations of the present disclosure, an object entry associated with the target object may be determined based on an index entry in the local index 310. It will be understood since the local index 310 only comprises entries related to valid nodes and the number of entries is far less than the number of leaf nodes in the partition index 150, even if there is no index information, the desired object entry still can be found with higher efficiency. According to example implementations of the present disclosure, the local index 310 may further comprise index information in non-leaf nodes in the partition index 150. At this point, the object entry may be found more quickly by using the index information.

Subsequently, an address of the at least one chunk may be determined based on the object entry. With the foregoing example implementations, metadata of the target object to be accessed may be directly found in the local index 310. Compared with traditionally searching for the identifier of the target object in a great number of nodes in the partition index 150, the entry related to the target object can be quickly found in the local index 310, and further the response speed of the storage system 100 towards the access request can be increased.

According to example implementations of the present disclosure, the method 400 of the present disclosure may be performed at a node device in the storage system 100. Here, the node device is assigned for managing the group of object included in the partition. In order to further increase the efficiency of accessing the local index 310, the local index 310 may be generated in a cache of the node device. It will be understood the local index 310 here describes the latest-version metadata of various objects included in the partition. Therefore, when a request for an object is received, the target object to be accessed will be hit in the cache with a hit rate of 100%. With the foregoing example implementations, the index hit rate may be improved significantly, and further the response speed of the storage system 100 towards data access requests may be increased.

It will be understood the node device here may be any type of computing device for managing a partition. If the storage devices 112, 114, . . . , 116 include extra processing resources, then a task for managing a partition may be assigned to these storage devices. At this point, where the storage system 100 comprises multiple partitions, these partitions may be managed in a distributed manner. For example, the storage device 112 may be used to manage one group of partitions, and the storage device 114 may be used to manage another group of partitions. For another example, the node device may further be other device in the storage system 100.

According to example implementations of the present disclosure, if it is detected the partition index 150 is updated, the local index 310 may be modified based on the updated partition index. In this way, the consistency between content in the local index 310 and content in the partition index 150 can be ensured. In other words, it can be ensured the metadata in the local index 310 are the latest valid data. During the running of the storage system 100, when an access request for the target object is received, the access request may always be served based on the latest valid metadata.

Figure 6:
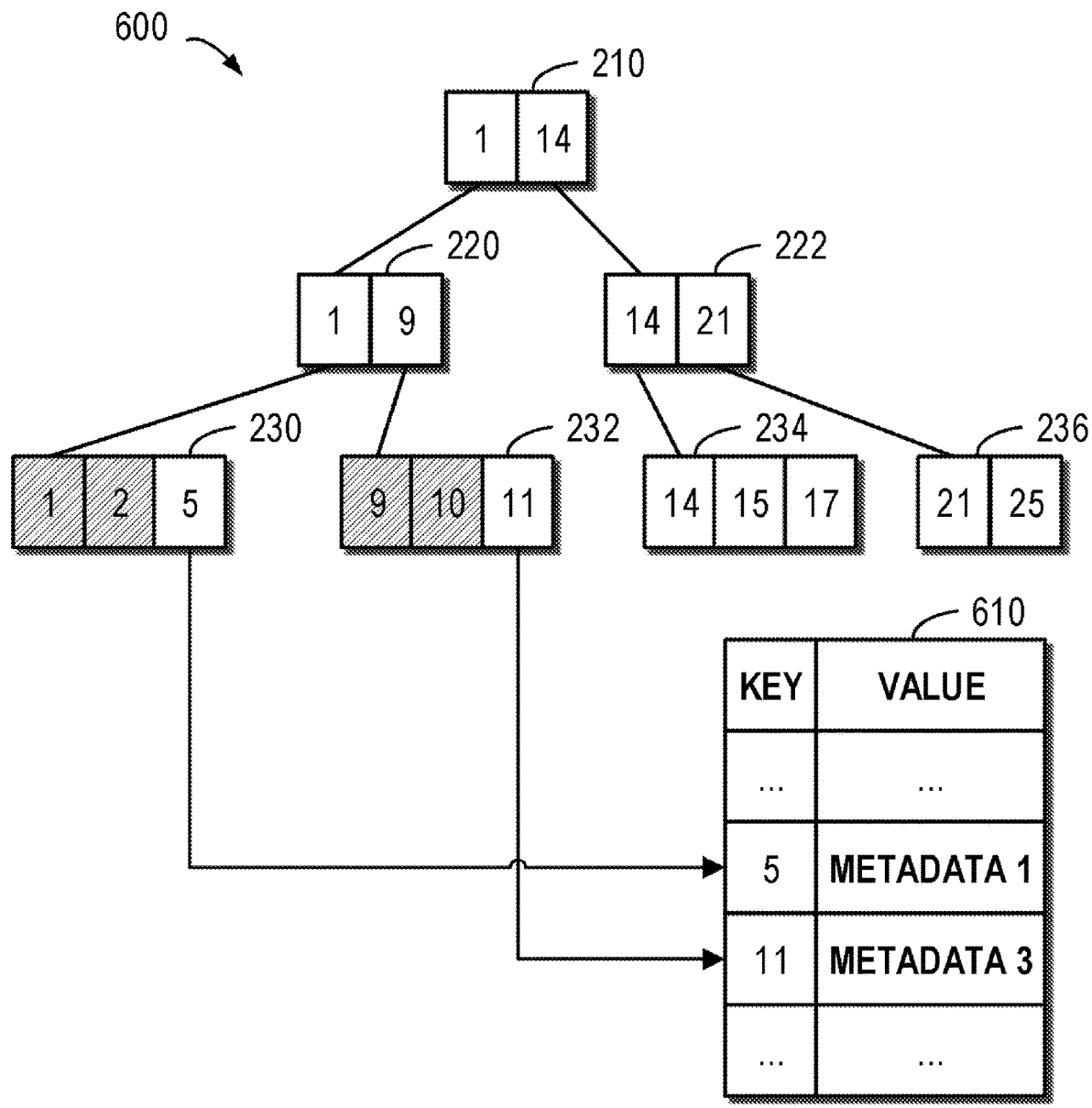
FIG. 6 illustrates a schematic view for modifying a local index based on an updated partition index according to implementations of the present disclosure.

FIG. 6 shows a schematic view 600 for modifying the local index 310 based on the updated partition index 150 according to implementations of the present disclosure. As depicted, suppose an object with a keyword of 10 in the storage system 100 is deleted, at this point a leaf node with a keyword of 10 in the partition index 150 will be marked as invalid. In order to ensure the consistency between the local index 310 and the partition index 150, an object entry related to the object with the keyword of 10 needs to be deleted from the local index 310. The modified local index is as shown by a reference numeral 610, which only comprises object entries associated with valid nodes, and the object entry associated with the object with the keyword of 10 has been deleted.

It will be understood FIG. 6 merely schematically shows the situation in which metadata of one object in the storage system 100 are updated. In order to ensure the running efficiency of the storage system 100, the version of the partition index 150 is usually updated in batches. During the running of the storage system 100, in order to improve the efficiency of managing the partition index 150, usually a "dump" operation is triggered to form a new-version partition index when updated nodes in the partition index 150 amount to a given number. Since metadata of multiple objects may be updated simultaneously in one batch, at this point multiple object entries in the local index 310 need to be updated for multiple updated objects respectively. According to example implementations of the present disclosure, in order to modify the local index based on the updated partition index, updated nodes in the updated partition index 150 may be determined first. Then, the local index 310 may be updated based on determined nodes.

Figure 7:
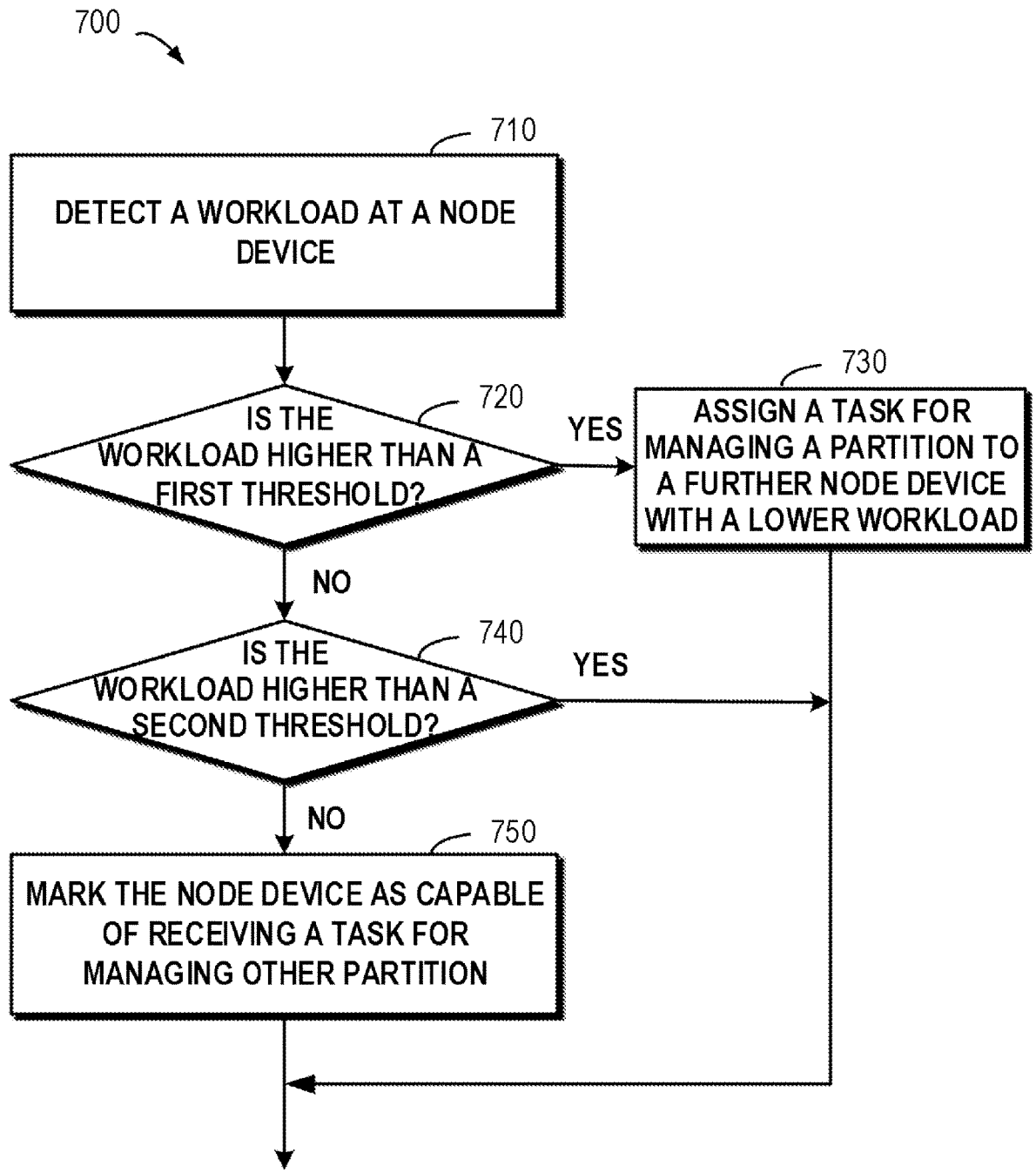
FIG. 7 schematically illustrates a flowchart of a method for assigning a task for managing a partition based on workloads of node devices according to implementations of the present disclosure.

According to example implementations of the present disclosure, a node that manages a specific partition may be adjusted dynamically based on workloads at various node devices in the storage system 100. With reference to FIG. 7, description is presented below on how to perform the adjustment dynamically. FIG. 7 schematically shows a flowchart of a method 700 for assigning a task for managing a partition based on workloads of node devices according to implementations of the present disclosure. It will be understood the method 700 schematically shows the process of performing the dynamic adjustment at one node device.

According to example implementations of the present disclosure, the storage system may comprise multiple partitions, and each partition has its own partition index. At this point, the management task may be assigned to a node device with a lower workload. With the foregoing example implementations, the processing capability of an idle node device in the storage system may be utilized more effectively.

The method 700 may be performed for one or more node devices in the storage system 100. As shown in FIG. 7, at block 710 a workload of a node device may be detected. At block 720, if the workload is higher than a first threshold, this means the current node has lower performance and is no longer suitable to manage the partition. At this point, the method 700 proceeds to block 730 so as to assign the task for partition management to a further node device with a lower workload. Specifically, the local index 310 may be migrated to a further node device, and then the further node device may be assigned to manage the partition. With the foregoing example implementations, when it is found the node device has a higher workload and cannot manage various objects in the partition effectively, the management task may be assigned to other node device with sufficient processing resources.

At block 720, if it is detected the workload at the node device is lower than the first threshold, the method 700 proceeds to block 740 to determine whether the workload is higher than a second threshold (the second threshold here is lower than the first threshold). If the workload is higher than the second threshold, this means at this point the workload is between the first threshold and the second threshold and falls within a normal range. Thus, the dynamic adjustment is not performed, but the current node device continues managing the partition. At block 740, if the workload is lower than the second threshold, this means the node device has a lower workload and contains extra idle resources for managing other partition. At this point, the method 700 may proceed to block 750, and the node device may be marked as capable of receiving a task for managing other partition.

Figure 8:
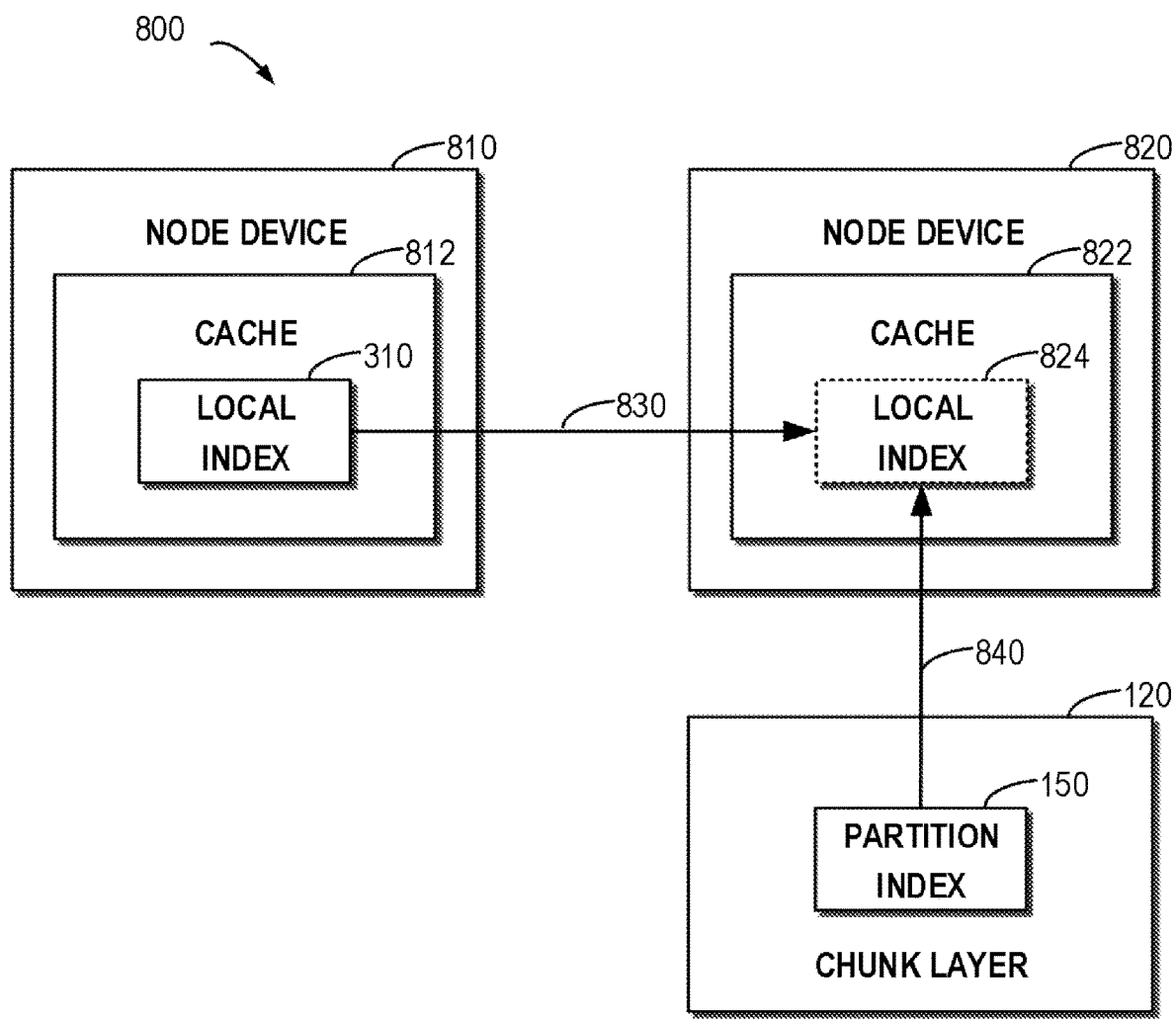
FIG. 8 schematically illustrates a block diagram for assigning a task for managing a partition to a further node device according to implementations of the present disclosure.

Further, the node device may receive a task for managing another partition. Specifically, another local index for another partition index may be obtained from a further node device in the storage system 100. With the foregoing example implementations, the processing capability of an idle node device in the storage system 100 may be utilized more effectively. With reference to FIG. 8, description is presented below on how to dynamically assign a task for managing a partition between two node devices.

FIG. 8 schematically shows a block diagram 800 for assigning a task for managing a partition to another node device according to implementations of the present disclosure. FIG. 8 shows a node device 810 and a node device 820, among which the node device 810 has been assigned for managing a partition. At this point, a cache 812 of the node device 810 may comprise a local index 310 which is built for managing the partition. It will be understood although as shown in FIG. 8 the cache 812 only comprises the local index 310, the node device 810 may further be assigned for managing multiple partitions simultaneously, and the cache 812 will comprise multiple local index for the multiple partitions.

When it is detected a workload of the node device 810 increases and is higher than a first threshold, the management task may be migrated to the node device 820 with a lower workload (e.g., lower than a second threshold). Specifically, as shown by an arrow 830, the local index 310 may be migrated to a cache 822 of the node device 820 so as to form a local index 824 and indicate the node device 820 manages the partition.

When the node device 820 receives the management task, first it may be checked whether the local index 824 is consistent with the partition index 150 of the partition. The partition index 150 may be read from the chunk layer 120 of the storage system 100, and it may be determined whether the local index 824 comprises object entries associated with all valid leaf nodes in the partition index 150 or not. If the result is yes, this means the local index 824 is consistent with the partition index 150 and subsequent operations may be performed based on the local index 824. If not, then as shown by an arrow 840, an object entry in the local index 824 needs to be updated using the partition index 150.

The migration of the partition management task from the node device 810 to the node device 820 has been illustrated with reference to FIG. 8. During the running of the storage system 100, when the workload of the node device 810 reduces below the second threshold, a partition management task may be received from other node device with a higher workload. At this point, the node device 810 may receive a partition index from other node device, and updates a corresponding local index of the partition index based on a comparison between the received partition index and the local index. With the foregoing example implementations, workloads of various node devices may be taken into consideration, and a balance may be stricken among workloads of various node devices so as to improve the overall performance of the storage system 100.

While examples of the method according to the present disclosure have been described in detail with reference to FIGS. 2 to 8, description is presented below to implementations of a corresponding apparatus. According to example implementations of the present disclosure, there is provided an apparatus for managing a storage system, the storage system comprising at least one partition, a partition of the at least one partition comprising a group of objects. The apparatus comprises: an obtaining module configured to obtain a partition index associated with the partition, the partition index comprising a group of nodes, a node in the group of nodes indicating metadata of an object in the group of objects; an identifying module configured to identify a valid node in the partition index, the valid node indicating valid metadata of an object associated with the valid node in the storage system; a generating module configured to generate a local index for the partition index based on the valid node; and an accessing module configured to, in response to receiving an access request for a target object in the group of objects, access the target object in the storage system based on the local index.

According to example implementations of the present disclosure, the apparatus is implemented at a node device in the storage system, the node device being assigned for managing the group of objects included in the partition.

According to example implementations of the present disclosure, the generating module is further configured to generate the local index in a cache of the node device.

According to example implementations of the present disclosure, the partition index is an append-type tree index, the group of nodes comprises at least one leaf node and at least one non-leaf node, the valid node is a leaf node of the at least one leaf node.

According to example implementations of the present disclosure, the generating module is further configured to: generate an index entry in the local index based on the at least one non-leaf node; determine the valid node based on the at least one leaf node; and generate an object entry in the local index based on a key and a value in the valid node, the key indicates an identifier of the object, the value indicating metadata of the object.

According to example implementations of the present disclosure, the metadata of the object comprise an address of at least one chunk of the object, and the accessing module is further configured to: determine an address of at least one chunk of the target object based on the local index; and access the target object in the storage system based on an address of the at least one chunk.

According to example implementations of the present disclosure, the accessing module is further configured to: determine an object entry associated with the target object based on an index entry in the local index; and determine an address of the at least one chunk based on the object entry.

According to example implementations of the present disclosure, the apparatus further comprises an updating module configured to: in response to the partition index being updated, modify the local index based on the updated partition index.

According to example implementations of the present disclosure, the updating module is further configured to: determine an updated node in the updated partition index; and update the local index based on the determined node.

According to example implementations of the present disclosure, the apparatus further comprises an adjusting module configured to: in response to detecting a workload at the node device is higher than a first threshold, migrate the local index to a further node device among multiple node devices included in the storage system.

According to example implementations of the present disclosure, the storage system comprises a further partition and a further partition index associated with the further partition, and the adjusting module is further configured to: in response to detecting a workload at the node device is lower than a second threshold, obtain a further local index for the further partition index from a further node device in the storage system.

According to example implementations of the present disclosure, the adjusting module is further configured to: obtain the further partition index; and update the further local index based on a comparison between the further partition index and the further local index.

Figure 9:
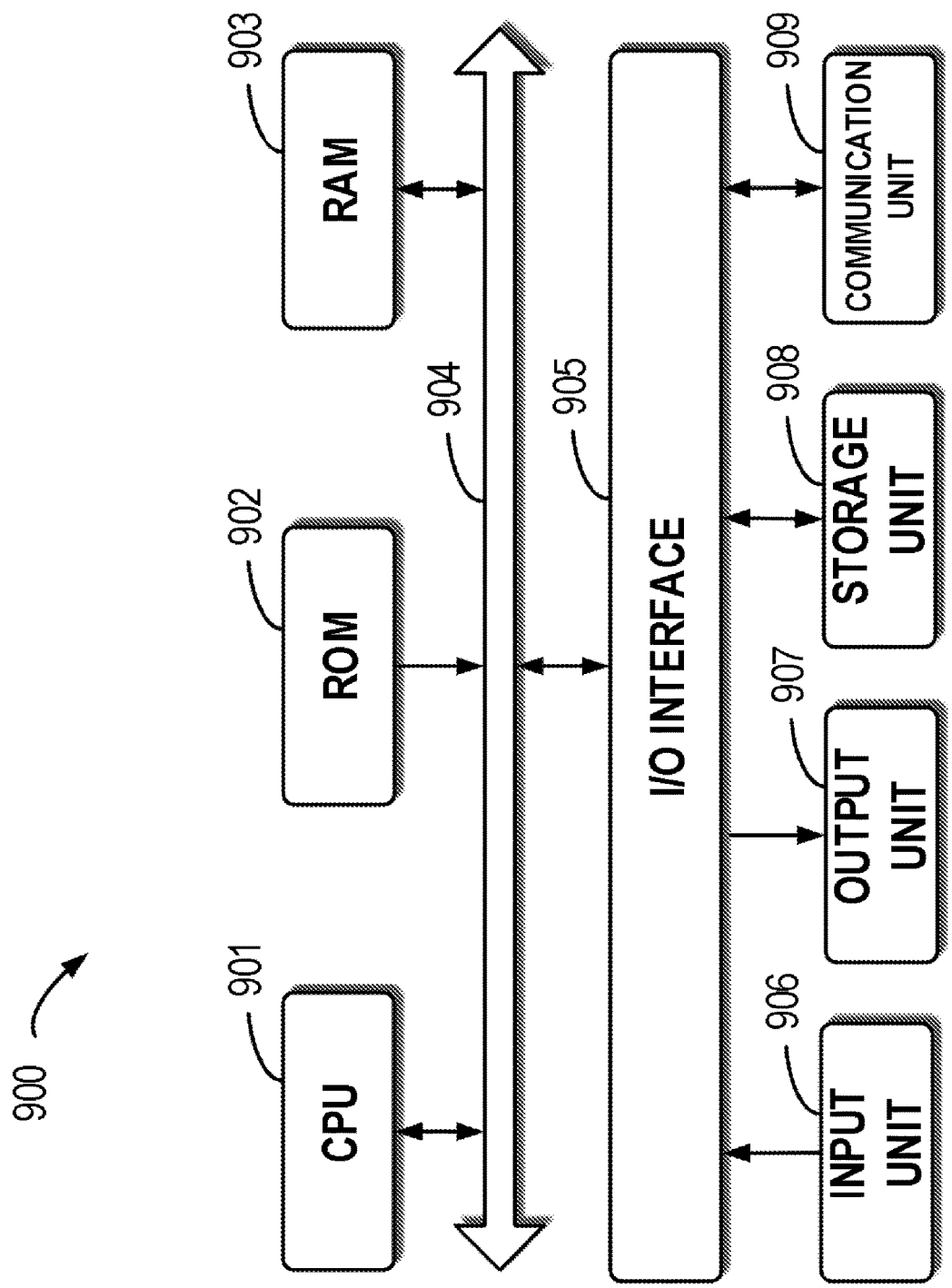
FIG. 9 schematically illustrates a block diagram of a device for managing a storage system according to example implementations of the present disclosure.

FIG. 9 schematically shows a block diagram of a device 900 for managing a storage system according to example implementations of the present disclosure. As depicted, the device 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the device 900. CPU 901, ROM 902 and RAM 903 are connected to each other via a bus 904. The input/output (I/O) interface 905 is also connected to the bus 904.

A plurality of components in the device 900 is connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the device 900 to exchange information/data with other devices via the computer network, such as Internet, and/or various telecommunication networks.

The above described each process and treatment, such as the methods 400 and 700, can also be executed by the processing unit 901. For example, in some implementations, the methods 400 and 700 can be implemented as a computer software program tangibly included in the machine-readable medium, e.g., the storage unit 908. In some implementations, the computer program can be partially or fully loaded and/or mounted to the device 900 via ROM 902 and/or the communication unit 909. When the computer program is loaded to the RAM 903 and executed by the CPU 901, one or more steps of the above described methods 400 and 700 can be implemented. Alternatively, in other implementations, the CPU 901 also can be configured in other suitable manners to realize the above procedure/method.

According to example implementations of the present disclosure, there is provided a device for managing a storage system, the storage system comprising at least one partition, a partition of the at least one partition comprising a group of objects. The device comprises: at least one processor; a volatile memory; and a memory coupled to the at least one processor, the memory having instructions stored thereon, the instructions, when executed by the at least one processor, causing the device to perform acts. The acts include: obtaining a partition index associated with the partition, the partition index comprising a group of nodes, a node in the group of nodes indicating metadata of an object in the group of objects; identifying a valid node in the partition index, the valid node indicating valid metadata of an object associated with the valid node in the storage system; generating a local index for the partition index based on the valid node; and in response to receiving an access request for a target object in the group of objects, accessing the target object in the storage system based on the local index.

According to example implementations of the present disclosure, the acts are performed at a node device in the storage system, the node device is assigned for managing the group of objects included in the partition, and generating a local index for the partition index comprises: generating the local index in a cache of the node device.

According to example implementations of the present disclosure, the partition index is an append-type tree index, the group of nodes comprises at least one leaf node and at least one non-leaf node, and the valid node is a leaf node of the at least one leaf node.

According to example implementations of the present disclosure, generating the local index based on the valid node comprises: generating an index entry in the local index based on the at least one non-leaf node; determining the valid node based on the at least one leaf node; and generating an object entry in the local index based on a key and a value in the valid node, the key indicates an identifier of the object, the value indicating metadata of the object.

According to example implementations of the present disclosure, the metadata of the object comprise an address of at least one chunk of the object, and accessing the target object based on the local index comprises: determining an address of at least one chunk of the target object based on the local index; and accessing the target object in the storage system based on an address of the at least one chunk.

According to example implementations of the present disclosure, determining an address of at least one chunk of the target object based on the local index comprises: determining an object entry associated with the target object based on an index entry in the local index; and determining an address of the at least one chunk based on the object entry.

According to example implementations of the present disclosure, the acts further comprise: in response to the partition index being updated, modifying the local index based on the updated partition index.

According to example implementations of the present disclosure, modifying the local index based on the updated partition index comprises: determining an updated node in the updated partition index; and updating the local index based on the determined node.

According to example implementations of the present disclosure, the acts further comprise: in response to detecting a workload at the node device is higher than a first threshold, migrating the local index to a further node device among multiple node devices included in the storage system.

According to example implementations of the present disclosure, the storage system comprises a further partition and a further partition index associated with the further partition.

According to example implementations of the present disclosure, the acts further comprise: in response to detecting a workload at the node device is lower than a second threshold, obtaining a further local index for the further partition index from a further node device in the storage system.

According to example implementations of the present disclosure, the acts further comprise: obtaining the further partition index; and updating the further local index based on a comparison between the further partition index and the further local index.

According to example implementations of the present disclosure, there is provided a computer program product. The computer program product is tangibly stored on a non-transient computer readable medium and comprises machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:
1. A method, comprising:
  obtaining, by a node device in a storage system and comprising a processor, a partition index associated with a partition, of at least one partition of a storage system, wherein the node device is assigned for management of a group of objects included in the partition, the partition index comprising a group of nodes, a node in the group of nodes indicating metadata of an object in the group of objects;
  identifying a valid node in the partition index, the valid node indicating valid metadata of an associated object associated with the valid node in the storage system;
  generating a local index for the partition index in a cache of the node device based on the valid node;
  in response to detecting that a workload at the node device is higher than a threshold, migrating the local index to a further node device among multiple node devices included in the storage system; and
  in response to receiving an access request for a target object in the group of objects, accessing the target object in the storage system based on the local index.

2. The method of claim 1, wherein the partition index is an append-type tree index, wherein the group of nodes comprise at least one leaf node and at least one non-leaf node, wherein the valid node is a leaf node of the at least one leaf node, and wherein generating the local index based on the valid node comprises:
  generating an index entry in the local index based on the at least one non-leaf node;
  determining the valid node based on the at least one leaf node; and
  generating an object entry in the local index based on a key and a value in the valid node, the key indicating an identifier of the associated object, the value indicating the valid metadata of the associated object.

3. The method of claim 2, wherein the valid metadata of the associated object comprises a first address of at least one first chunk of the associated object, and wherein the accessing the target object based on the local index comprises:
  determining a second address of at least one second chunk of the target object based on the local index; and
  accessing the target object in the storage system based on the second address of the at least one second chunk.

4. The method of claim 3, wherein the generating the object entry comprises generating a first object entry, wherein the generating the index entry comprises generating a first index entry, and wherein the determining the second address of the at least one second chunk of the target object based on the local index comprises:
  determining a second object entry associated with the target object based on a second index entry in the local index; and
  determining the second address of the at least one second chunk based on the second object entry.

5. The method of claim 1, further comprising:
  in response to the partition index being updated, resulting in an updated partition index, modifying the local index based on the updated partition index.

6. The method of claim 5, wherein modifying the local index based on the updated partition index comprises:

determining an updated node in the updated partition index; and updating the local index based on the updated node.

7. The method of claim 1, wherein the storage system comprises a further partition and a further partition index associated with the further partition, and further comprising:

in response to detecting that the workload at the node device is lower than the threshold, obtaining a further local index for the further partition index from the further node device in the storage system.

8. The method of claim 7, further comprising:

obtaining the further partition index; and updating the further local index based on a comparison between the further partition index and the further local index.

9. A node device in a storage system for managing the storage system, the storage system comprising at least one partition, a partition of the at least one partition comprising a group of objects, wherein the node device is assigned to manage the group of objects included in the partition, the node device comprising:

at least one processor; and a memory coupled to the at least one processor, the memory having instructions stored thereon, the instructions, when executed by the at least one processor, causing the node device to perform acts, including:

obtaining a partition index associated with the partition, the partition index comprising a group of nodes, wherein a node in the group of nodes indicates metadata of an object in the group of objects;

identifying a valid node in the partition index, the valid node indicating valid metadata of another object associated with the valid node in the storage system;

generating a local index for the partition index in a cache of the node device based on the valid node;

in response to detecting that a workload at the node device is higher than a first threshold, migrating the local index to a further node device among multiple node devices included in the storage system; and in response to receiving an access request for a target object in the group of objects, accessing the target object in the storage system based on the local index.

10. The node device of claim 9, wherein the partition index is an append-type tree index, the group of nodes comprising at least one leaf node and at least one non-leaf node, the valid node being a leaf node of the at least one leaf node, and wherein the generating the local index based on the valid node comprises:

generating an index entry in the local index based on the at least one non-leaf node;

determining the valid node based on the at least one leaf node; and generating an object entry in the local index based on a key and a value in the valid node, the key indicating an identifier of the other object, the value indicating other metadata of the other object.

11. The node device of claim 10, wherein the other metadata of the other object comprises an address of at least one chunk of the other object, and the accessing the target object based on the local index comprises:

determining an address of at least one chunk of the target object based on the local index; and accessing the target object in the storage system based on an address of the at least one chunk.

12. The node device of claim 11, wherein the determining the address of the at least one chunk of the target object based on the local index comprises:

determining another object entry associated with the target object based on an index entry in the local index; and determining an address of the at least one chunk based on the other object entry.

13. The node device of claim 9, the acts further comprising:

in response to the partition index being updated, resulting in an updated partition index, modifying the local index based on the updated partition index.

14. The node device of claim 13, wherein the modifying the local index based on the updated partition index comprises:

determining an updated node in the updated partition index; and updating the local index based on the updated node.

15. The node device of claim 9, wherein the storage system comprises a further partition and a further partition index associated with the further partition, and the acts further comprising:

in response to detecting the workload at the node device is lower than a second threshold, obtaining a further local index for the further partition index from the further node device in the storage system;

obtaining the further partition index; and updating the further local index based on a comparison between the further partition index and the further local index.

16. A computer program product, stored on a non-transitory computer readable medium and comprising machine executable instructions which are used to implement operations for managing a storage system, the storage system comprising at least one partition, a partition of the at least one partition comprising a group of objects, wherein the operations are performed at a node device in the storage system, the node device having been assigned as a manager of the group of objects included in the partition, the operations comprising:

obtaining a partition index associated with the partition, the partition index comprising a group of nodes, a node in the group of nodes indicating metadata of an object in the group of objects;

identifying a valid node in the partition index, the valid node indicating valid metadata of an object associated with the valid node in the storage system;

generating a local index for the partition index in a cache of the node device based on the valid node;

in response to detecting that a workload at the node device is higher than a threshold, migrating the local index to a further node device among multiple node devices included in the storage system; and in response to receiving an access request for a target object in the group of objects, accessing the target object in the storage system based on the local index.

17. The computer program product of claim 16, wherein the partition index is an append-type tree index, wherein the group of nodes comprise at least one leaf node and at least one non-leaf node, wherein the valid node is a leaf node of the at least one leaf node, and wherein the generating the local index based on the valid node comprises:

generating an index entry in the local index based on the at least one non-leaf node;

determining the valid node based on the at least one leaf node; and generating an object entry in the local index based on a key and a value in the valid node, the key indicating an identifier of the associated object, the value indicating the valid metadata of the associated object.

18. The computer program product of claim 17, wherein the valid metadata of the associated object comprises a first address of at least one first chunk of the associated object, and wherein the accessing the target object based on the local index comprises:
  determining a second address of at least one second chunk of the target object based on the local index; and
  accessing the target object in the storage system based on the second address of the at least one second chunk.

19. The computer program product of claim 16, further comprising:
  in response to the partition index being updated, resulting in an updated partition index, modifying the local index based on the updated partition index.

20. The computer program product of claim 19, wherein the modifying the local index based on the updated partition index comprises:
  determining an updated node in the updated partition index; and
  updating the local index based on the updated node.

* * * * *